United States Patent
Tanigawa et al.

(10) Patent No.: US 10,946,633 B2
(45) Date of Patent: Mar. 16, 2021

(54) ADDITIVE MANUFACTURING METHOD

(71) Applicant: MITSUBISHI HEAVY INDUSTRIES, LTD., Tokyo (JP)

(72) Inventors: Shuji Tanigawa, Tokyo (JP); Masashi Kitamura, Tokyo (JP); Yasuyuki Fujiya, Tokyo (JP); Shuho Tsubota, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 180 days.

(21) Appl. No.: 16/211,350

(22) Filed: Dec. 6, 2018

(65) Prior Publication Data

US 2019/0275779 A1  Sep. 12, 2019

(30) Foreign Application Priority Data

Mar. 8, 2018  (JP) .............................. JP2018-041425

(51) Int. Cl.
| | |
|---|---|
| *B32B 37/18* | (2006.01) |
| *B32B 38/10* | (2006.01) |
| *B24C 1/04* | (2006.01) |
| *B23P 15/00* | (2006.01) |
| *B24C 1/00* | (2006.01) |
| *B24C 5/00* | (2006.01) |
| *B22F 3/105* | (2006.01) |

(Continued)

(52) U.S. Cl.
CPC ............ *B32B 37/18* (2013.01); *B22F 3/1055* (2013.01); *B23P 15/00* (2013.01); *B24C 1/003* (2013.01); *B24C 1/006* (2013.01); *B24C 1/04* (2013.01); *B24C 5/00* (2013.01); *B32B 38/10* (2013.01); *F23R 3/002* (2013.01); *B22F 2003/1058* (2013.01); *B22F 2999/00* (2013.01); *B29C 64/40* (2017.08); *B33Y 40/00* (2014.12)

(58) Field of Classification Search
CPC ........... B32B 37/18; B32B 38/10; B23C 1/04; B23C 1/006; B23C 1/003; B23P 15/00; B24C 5/00; B22F 3/1055; B22F 2999/00; B22F 2003/1058; F23R 3/002; B33Y 40/00; B33Y 10/00; B29C 64/40
See application file for complete search history.

(56) References Cited

U.S. PATENT DOCUMENTS

| | | | |
|---|---|---|---|
| 2010/0170965 | A1 | 7/2010 | Broecker |
| 2016/0222791 | A1 | 8/2016 | Rogers |

(Continued)

FOREIGN PATENT DOCUMENTS

| | | |
|---|---|---|
| EP | 3 025 810 | 6/2016 |
| EP | 3 278 908 | 2/2018 |

(Continued)

OTHER PUBLICATIONS

Japanese Office Action dated Feb. 4, 2020 in corresponding Japanese Patent Application No. 2018-041425 with Machine Translation.

(Continued)

*Primary Examiner* — Moshe Wilensky
(74) *Attorney, Agent, or Firm* — Wenderoth, Lind & Ponack, L.L.P.

(57) ABSTRACT

An additive manufacturing method of manufacturing a product by laminating metal includes: laminating the metal so as to form a half-finished product of the product and a support; and spraying dry ice pellets having a particle shape to the support, after the laminating.

11 Claims, 7 Drawing Sheets

(51) Int. Cl.
*F23R 3/00* (2006.01)
*B33Y 40/00* (2020.01)
*B29C 64/40* (2017.01)

(56) References Cited

U.S. PATENT DOCUMENTS

2017/0014950 A1  1/2017  Okada
2017/0297109 A1  10/2017  Gibson et al.

FOREIGN PATENT DOCUMENTS

| | | |
|---|---|---|
| GB | 2541810 | 3/2017 |
| JP | 2002-5596 | 1/2002 |
| JP | 2007-1015 | 1/2007 |
| JP | 2007-203448 | 8/2007 |
| JP | 2011-005667 | 1/2011 |
| JP | 5615844 | 10/2014 |
| JP | 2016-113701 | 6/2016 |
| WO | 2011/135526 | 11/2011 |
| WO | 2014/104102 | 7/2014 |

OTHER PUBLICATIONS

Extended European Search Report dated Jun. 17, 2019 in corresponding European Patent Application No. 18210756.5.

ADDITIVE MANUFACTURING METHOD

TECHNICAL FIELD

The present disclosure relates to an additive manufacturing method of manufacturing products by laminating metal.

BACKGROUND ART

When using the 3D additive manufacturing method of manufacturing products by laminating metal to form an overhang portion, which has a surface facing downward in the laminating direction of metal, it is necessary to also form a support that supports the overhang portion together with the overhang portion. A support also functions to prevent deformation of manufactured parts, improve heat conductivity, and maintain the shape, and is used in various manufacturing scenes. While a support needs to be removed after manufacturing, it is often difficult to remove a support with a tool like a chisel or a hammer in a narrow portion that cannot be accessed by a worker or a tool. It is possible to reduce the manufacturing density of a support and remove the support by shot blast, but reducing the strength of the support may lead to deformation or breakage of the overhang portion during manufacturing.

Although not for removing supports, Patent Documents 1 to 4 disclose a technique to pulverize and remove marks or coatings, for instance, on the surface of various products, by spraying dry ice pellets onto the marks or coatings and causing a small explosion phenomenon when the dry ice pellets sublimate.

CITATION LIST

Patent Literature

Patent Document 1: JP5615844B
Patent Document 2: WO 2014/104102A
Patent Document 3: JP2007-1015A
Patent Document 4: JP2002-5596A

SUMMARY

The present inventors conducted intensive researches and found that it is possible to pulverize and remove supports by utilizing the small explosion phenomenon that occurs when dry ice pellets sublimate. None of Patent Documents 1 to 4 mentions removal of supports.

In view of the above, an object of at least one embodiment of the present disclosure is to provide an additive manufacturing method that facilitates removal of supports.

(1) According to at least one embodiment of the present invention, an additive manufacturing method of manufacturing a product by laminating metal includes: laminating the metal so as to form a half-finished product of the product and a support; and of spraying dry ice pellets having a particle shape to the support, after the laminating.

According to the above method (1), by spraying the dry ice pellets having a particle shape onto the support after forming the half-finished product and the support, a small explosion phenomenon that occurs at the time of sublimation of the dry ice pellets pulverizes at least a part of the support and removes the support, which facilitates removal of the support.

(2) In some embodiments, in the above method (1), the half-finished product includes at least one overhang portion having a surface facing downward in a laminating direction of the metal, and the support supports the at least one overhang portion.

According to the above method (2), by spraying the dry ice pellets having a particle shape onto the support after forming the half-finished product and the support supporting the overhang portion, a small explosion phenomenon that occurs at the time of sublimation of the dry ice pellets pulverizes at least a part of the support and removes the support, which facilitates removal of the support.

(3) In some embodiments, the above method (1) or (2) further includes removing the support by pulverizing at least a part of the support, after the spraying.

According to the above configuration (3), by spraying the dry ice pellets having a particle shape onto the support after forming the half-finished product and the support, a small explosion phenomenon that occurs at the time of sublimation of the dry ice pellets pulverizes at least a part of the support and removes the support, which facilitates removal of the support.

(4) In some embodiments, in the above method (3), the method further includes performing etching processing on the support before the removing.

According to the above method (4), the strength of the support decreases due to the etching processing, and thus it is possible to remove the high-strength support more efficiently.

(5) In some embodiments, in the above method (3) or (4), the laminating includes forming the support entirely as a porous body having a plurality of holes into which each of the dry ice pellets is capable of entering at least partially, and the removing includes pulverizing the support entirely.

According to the above method (5), the entire support can be pulverized by spraying the dry ice pellets to the entire support, and there is no need to aim at a predetermined portion of the support before spraying the dry ice pellets. Thus, it is possible to simplify spraying of dry ice.

(6) In some embodiments, in the above method (3) or (4), the support includes: a first region including a joint surface joined to the half-finished product; and a second region other than the first region. The laminating includes forming the first region as a porous body having a plurality of holes into which each of the dry ice pellets is capable of entering at least partially. The removing includes: pulverizing the first region by spraying the dry ice pellets to the first region; and removing a remainder which remains unpulverized after the pulverizing.

According to the above method (6), it is possible to remove the support by pulverizing the support only in the vicinity of the joint surface of the half-finished product, without pulverizing the support entirely. Thus, it is possible to reduce the usage amount of the dry ice pellets, and shorten the time required to remove the support.

(7) In some embodiments, in the above method (6), the second region includes a solid body.

According to this method, the strength of the support improves compared to a support that is entirely formed as a porous body, and thus the support strength of the overhang portion improves, which makes it possible to reduce the risk of deformation of the overhang portion during lamination.

(8) In some embodiments, in any one of the above methods (1) to (5), the support has a grid structure.

According to this method, the entire support can be formed to have a uniform configuration, and thus it is possible to simplify the design of the support.

(9) In some embodiments, in any one of the above configurations (1) to (8), the product is a turbocharger housing, a compressor impeller, a gas turbine blade, or a combustor component.

According to the above method (8), it is possible to facilitate removal of the support in additive manufacturing of a turbocharger housing, a compressor impeller, a gas turbine blade, or a combustor component.

According to at least one embodiment of the present disclosure, by spraying the dry ice pellets having a particle shape onto the support after forming the half-finished product and the support, a small explosion phenomenon that occurs at the time of sublimation of the dry ice pellets pulverizes at least a part of the support and removes the support, which facilitates removal of the support.

DETAILED DESCRIPTION

Embodiments of the present invention will now be described in detail with reference to the accompanying drawings. However, the scope of the present invention is not limited to the following embodiments. It is intended that dimensions, materials, shapes, relative positions and the like of components described in the embodiments shall be interpreted as illustrative only and not intended to limit the scope of the present invention.

Figure 1:
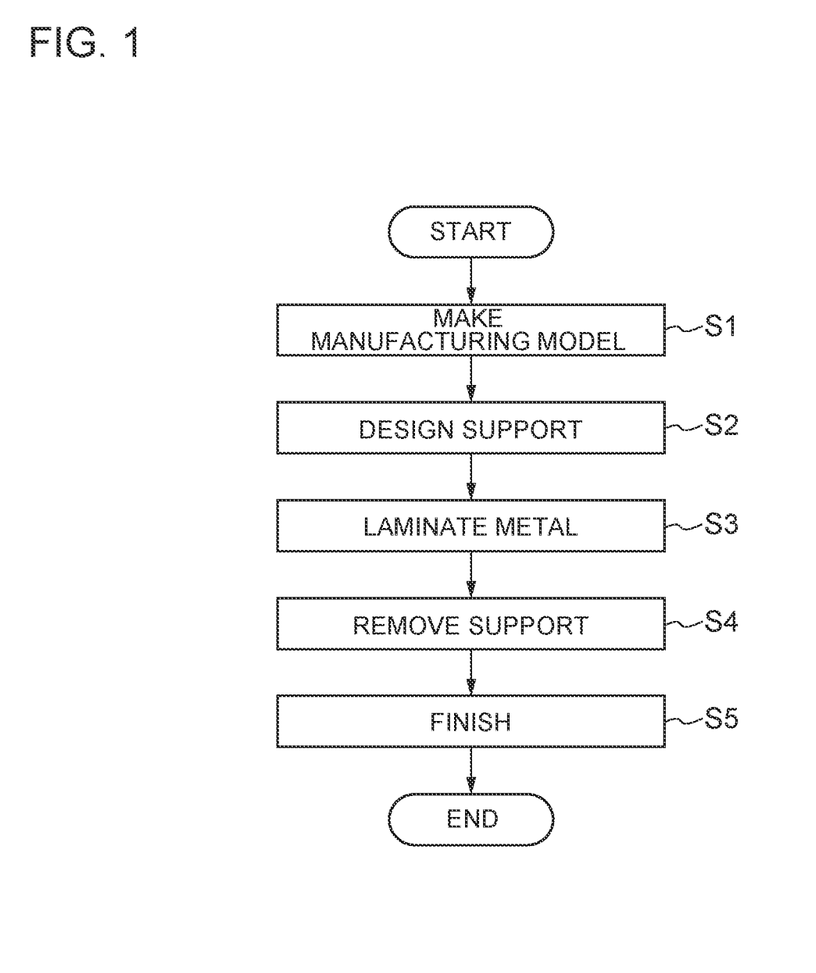
FIG. 1 is a flowchart of an additive manufacturing method according to an embodiment of the present disclosure.

An additive manufacturing method according to an embodiment of the present disclosure will be described with reference to the flowchart of FIG. 1.

Figure 2:
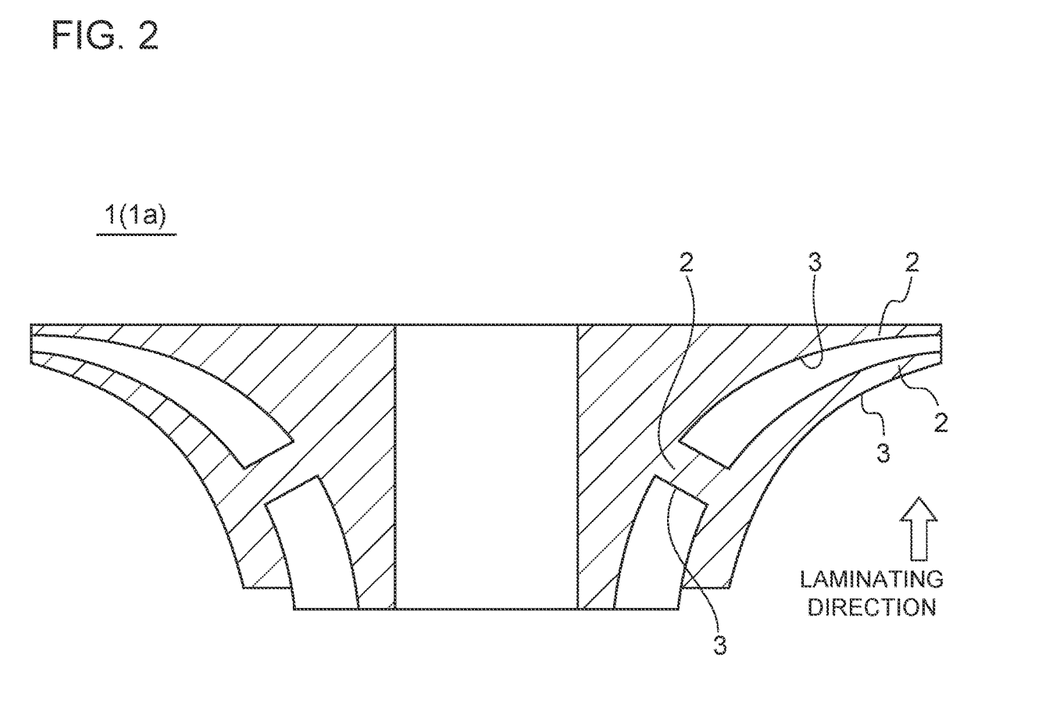
FIG. 2 is a cross-sectional view of an impeller of a turbocharger, which is a product manufactured by an additive manufacturing method according to an embodiment of the present disclosure.

First, a manufacturing model of a product is produced (step S1). In the following description, an impeller 1a of a compressor is used as an example of the product 1, as depicted in FIG. 2. In FIG. 2, the impeller 1a is depicted so that the laminating direction of metal for manufacturing the impeller 1a is the vertically upward direction. The impeller 1a includes an overhang portion 2 that has a surface 3 facing downward in the laminating direction of metal.

Figure 3:
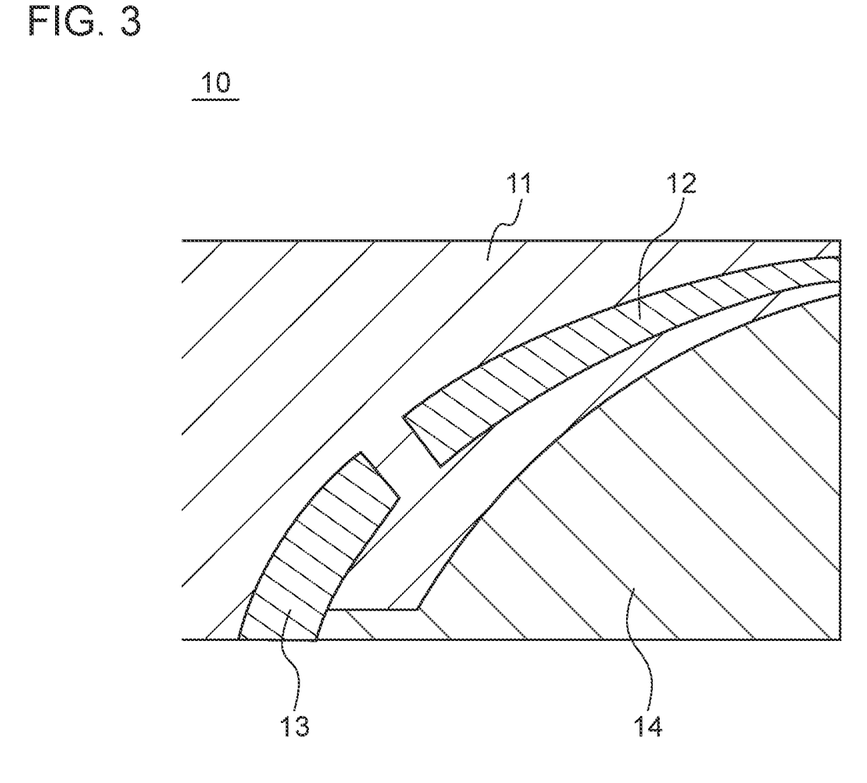
FIG. 3 is a cross-sectional view of a part of a manufacturing model produced by an additive manufacturing method according to an embodiment of the present disclosure.

FIG. 3 is a diagram showing a part of a manufacturing model 10 produced in step S1, for manufacturing the impeller 1a. The manufacturing model 10 includes a portion 11 corresponding to the half-finished product of the impeller 1a (see FIG. 2) formed by the additive manufacturing method according to an embodiment, and a plurality of portions 12, 13, 14 that correspond to a plurality of supports supporting the overhang portion 2 of the impeller 1a.

After step S1, a support is designed (step S2). In step S2, it is determined whether the support is to be pulverized and removed by spraying dry ice pellets (particle diameter 0.5 to 10 mm) or to be removed by a normal method. In a case where the manufacturing model includes a plurality of supports, the type of support is determined individually for each of the supports. For instance, as depicted in FIG. 3, the portions 12, 13 may be for supports to be pulverized and removed by spraying dry ice pellets, and the portion 14 may be for a support to be removed by a normal method.

The supports corresponding to the portions 12, 13 are designed to have a configuration which enables the supports to hold dry ice pellets, so as to receive the impact of the small explosion upon sublimation of the dry ice pellets. Such a configuration may include, for instance, a porous body including a plurality of holes into which a part of the dry ice pellets can enter partially. To form the support as such a porous body, it is determined whether the entire support is to be formed as a porous body, or a part of the support is to be formed as a porous body. In the latter case, the range to be formed as a porous body, and the configuration of the rest are determined. In the design of the porous body, the size and distribution of the holes may be uniform, or variable continuously or in stages. It is desirable to have a structure where the dry ice pellets can be held in a part of the porous body. Thus, the design does not include a structure that the dry ice pellets cannot enter, or a structure that cannot not hold the dry ice pellets and would be passed through by the dry ice pallets.

Figure 4:
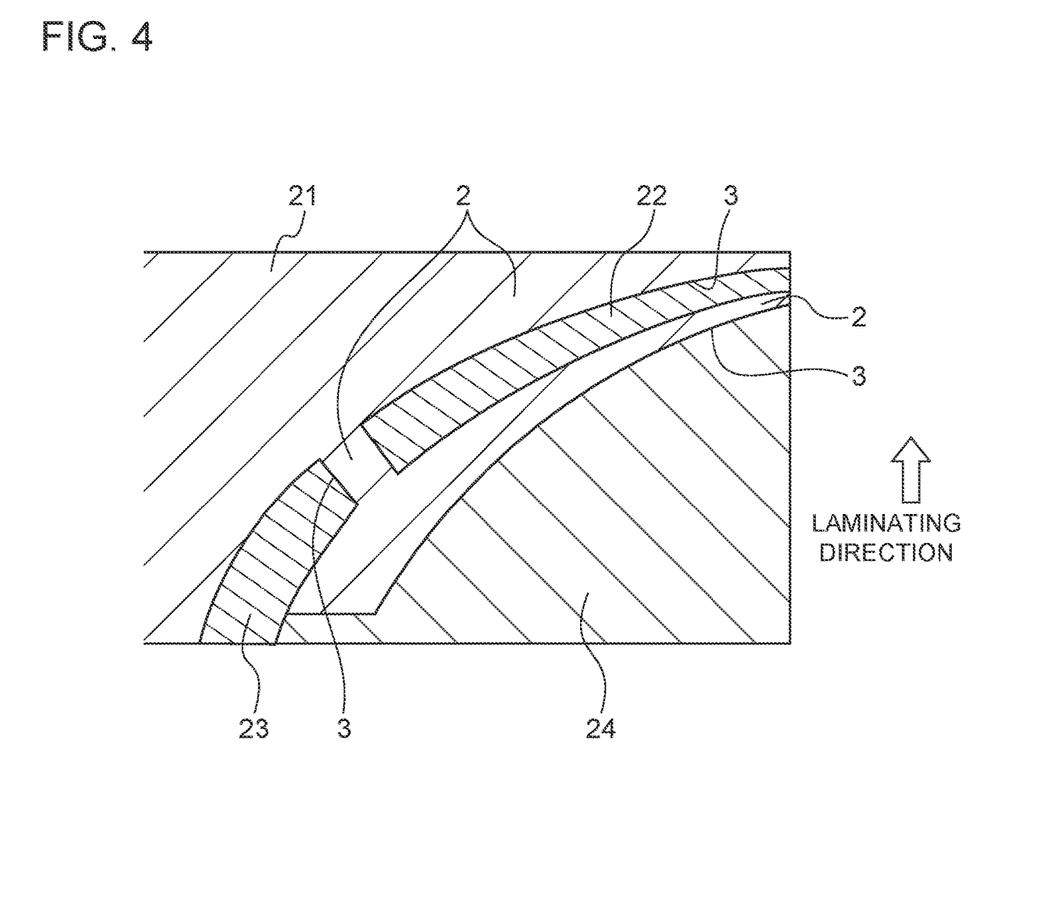
FIG. 4 is a cross-sectional view of a half-finished product and a support laminated by an additive manufacturing method according to an embodiment of the present disclosure.

After the step S2, on the basis of the design of the manufacturing model 10 and the supports, metal is laminated by a known method used in the 3D additive manufacturing method, such as the laser melting method and the electronic beam melting method (step S3). As depicted in FIG. 4, the half-finished product 21 formed by laminating metal includes an overhang portion 2 that has a surface 3 facing downward in the laminating direction of metal. In step S3, the half-finished product and supports 22, 23, 24 that support the overhang portion 2 are formed. In this embodiment described herein, the supports 22, 23 are to be pulverized and removed by spraying dry ice pellets, and the support 24 is to be removed by a normal method. Nevertheless, the support 24 may be also pulverized and removed by spraying dry ice pellets.

Figure 5:
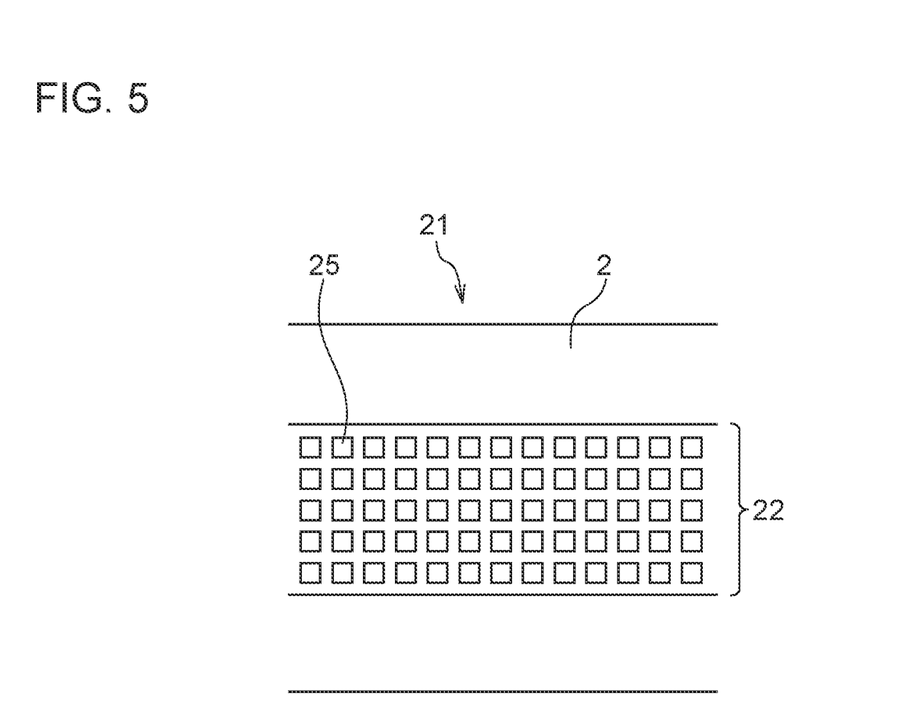
FIG. 5 is a partial enlarged view of an example of a support used in an additive manufacturing method according to an embodiment of the present disclosure.

As depicted in FIG. 5, the support 22 may be formed to have a grid structure, that is, formed as a porous body having a plurality of holes 25. Each hole 25 has a size that each of the dry ice pellets can at least partially enter, preferably formed to be between the minimum dimension part and the maximum dimension part of the dry ice pellet shape, and also has a labyrinth 3D structure that the dry ice pellets cannot easily pass through. In this case, the entire support 22 may be formed to have a uniform configuration, and thus the design of the support 22 can be simplified. Although not depicted, the support 23 may be formed to have a similar configuration.

Figure 6:
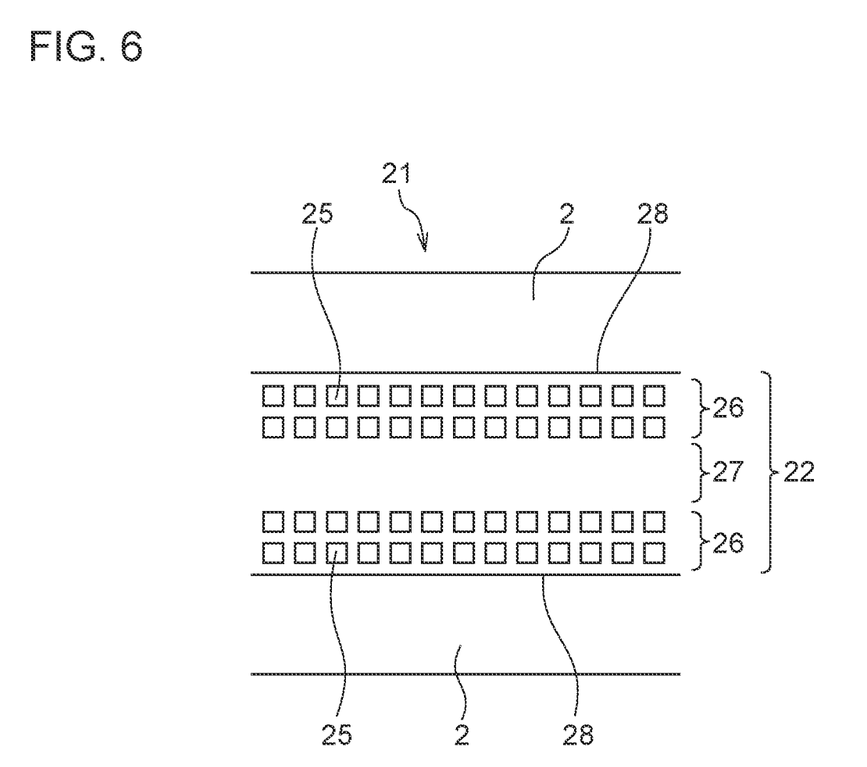
FIG. 6 is a partial enlarged view of another example of a support used in an additive manufacturing method according to an embodiment of the present disclosure.

As depicted in FIG. 6, the support 22 includes a first region 26 including a joint surface 28 joining to the half-finished product 21, and a second region 27 other than the first region 26. The first region 26 may be formed as a porous body having a plurality of holes 25 into which each of the dry ice pellets can enter at least partially. With the second region 27 formed as a solid body, the strength of the support 22 improves compared to a support that is entirely formed as a porous body. As a result, the support strength of the overhang portion 2 improves, and it is possible to reduce the risk of deformation of the overhang portion 2 during lamination of metal. Although not depicted, the support 23 may be formed to have a similar configuration.

Figure 7:
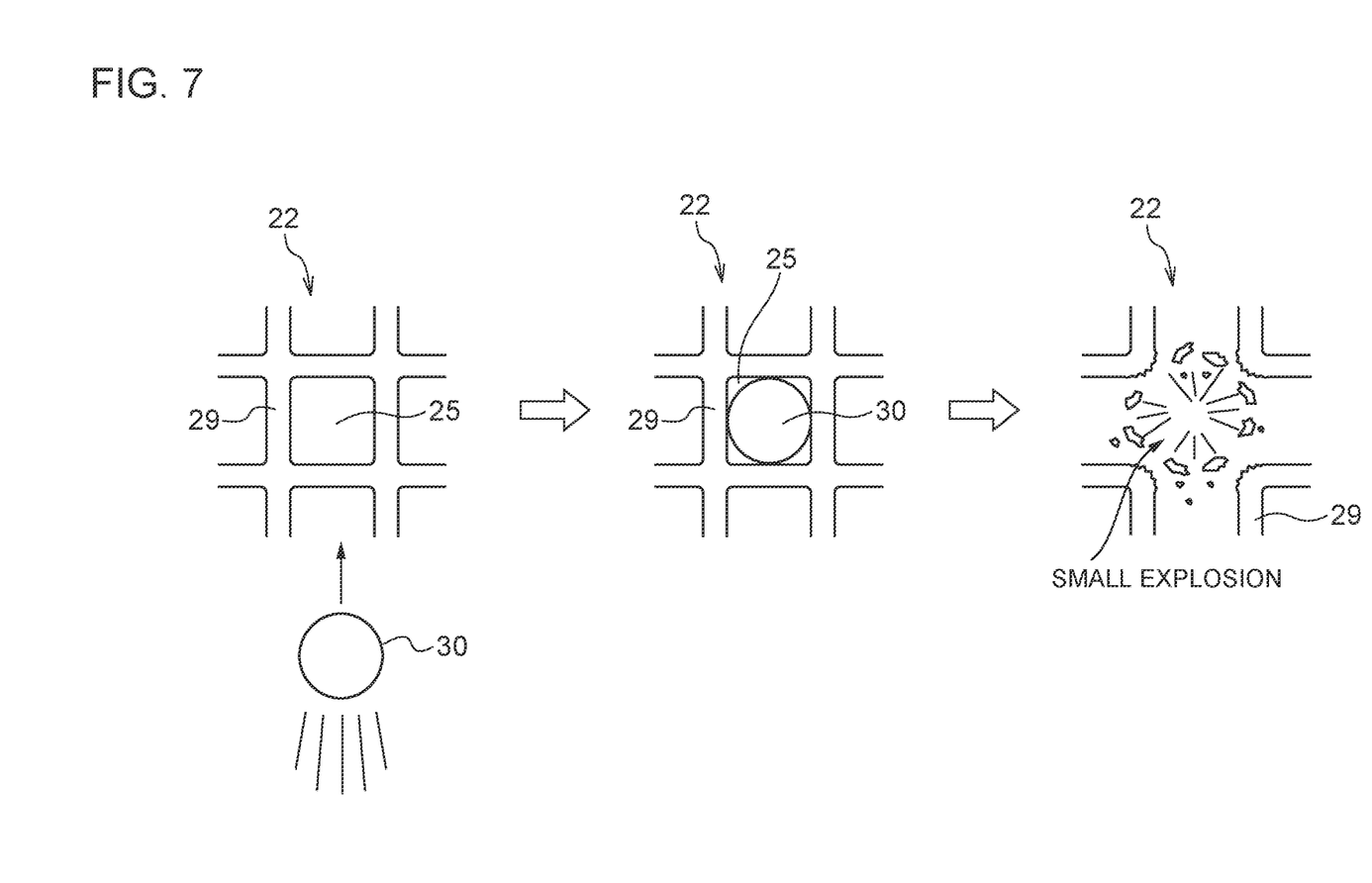
FIG. 7 is a diagram for describing the principle of pulverization of a support by dry ice pellets, in an additive manufacturing method according to an embodiment of the present disclosure.

After step S3, the support 22 is removed from the half-finished product 21 (step S4). Specifically, a support is removed from a half-finished product by pulverizing at least a part of the support by spraying the dry ice pellets onto the support. As depicted in FIG. 7, the dry ice pellets 30 sprayed onto the support 22 enter the holes 25 of the support 22 at least partially. As the dry ice pellets 30 sublimate in this state, small explosion occurs, where the volume of gas carbon dioxide expands to approximately 800 times the volume of the dry ice pellets 30. The impact of this small explosion breaks a frame 29 that defines the holes 25. As this phenomenon occurs in the plurality of holes 25, the support 22 is pulverized. Depending on the strength of the frame 29, the frame 29 may break apart due to the impact of collision between the sprayed dry ice pellets and the frame 29.

Furthermore, even if the dry ice pellets 30 sprayed onto the support 22 collide with the half-finished product 21 (see FIG. 4), the dry ice pellets 30 would be bounced back, and the half-finished product 21 would not be affected by the impact of the small explosion upon sublimation of the dry ice pellets 30. Thus, there is nearly no risk of damaging the half-finished product 21. Furthermore, since the dry ice pellets 30 sublimate and disappear, there is no need to recover the dry ice pellets 30.

In a case where the entire support 22 has a grid structure as shown in FIG. 5, the dry ice pellets 30 (see FIG. 7) are sprayed toward the entire support 22. Accordingly, the entire support 22 is pulverized and the support 22 is removed. In this case, the dry ice pellets 30 are sprayed onto the entire support 22, and there is no need to aim at a predetermined portion of the support 22 before spraying the dry ice pellets 30. Accordingly, it is possible to simplify spraying the dry ice pellets 30.

In a case where the support 22 has a porous body only in the first region 26 as shown in FIG. 6, the dry ice pellets 30 (see FIG. 7) are sprayed only onto the first region 26 (see FIG. 7). In this case, only the first region 26 of the support 22 is pulverized, but pulverization of the first region 26 causes the joint surface 28 to be broken, and thus the support 22 is detached from the half-finished product 22 (see FIG. 4). The support 22 is removed by removing the remaining portion of the support 22 detached from the half-finished product 21. Further, in this case, it is possible to remove the support 22 by pulverizing the support 22 only in the vicinity of the joint surface of the half-finished product 21 even without pulverizing the support 22 entirely. Thus, it is possible to reduce the usage amount of the dry ice pellets, and shorten the time required to remove the support 22.

The support 23 can be removed similarly to the support 22. The support 24 can be removed by a normal method.

Finally, the half-finished product 21 from which the support 22 is removed undergoes an inner surface polishing process such as grinder process and abrasive grain flow polishing (step S5), to remove the remaining support and obtain a finished smooth surface, and thereby the impeller 1a (see FIG. 2) is manufactured.

As described above, by spraying the dry ice pellets 30 having a particle shape onto the supports 22, 23 after forming the half-finished product 21 and the supports 22, 23 supporting the overhang portion 2, the small explosion phenomenon at the time of sublimation of the dry ice pellets 30 pulverizes at least a part of the supports 22, 23 and removes the supports 22, 23, which facilitates removal of the supports 22, 23.

While the supports 22, 23 are used to support the overhang portion 2 in this embodiment, supports are not limited to this. Supports may also function to prevent deformation of manufactured parts, improve heat conductivity, and maintain the shape, or may be used in various manufacturing scenes.

In this embodiment, before spraying the dry ice pellets 30, etching processing may be performed on the supports 22, 23 to reduce the strength of the supports 22, 23. Accordingly, it is possible to remove the high-strength supports 22, 23 more efficiently.

In this embodiment, as a configuration that is capable of holding the dry ice pellets 30, the support 22 is formed so as to include at least partially a porous body having a plurality of holes 25, but the support 22 is not limited to this embodiment. The support 22 to be used in the additive manufacturing method according to this embodiment may be a solid support 22 configured such that the surface of the support 22 becomes dented by the sprayed dry ice pellets 30 so that the dry ice pellets 30 can enter the dents, or a solid support 22 configured such that the sprayed dry ice pellets 30 dig into the surface of the support 22.

While the product 1 is described as the impeller 1a of the compressor as an example in this embodiment, the product 1 is not limited to this. For instance, a housing of a turbocharger including a hollow scroll flow passage, or a gas turbine blade or a combustor part having a complex interior cooling structure may be also manufactured by the additive manufacturing method according to the present embodiment.

The invention claimed is:

1. An additive manufacturing method of manufacturing a product by laminating metal, the additive manufacturing method comprising:
   laminating the metal so as to form a half-finished product of the product and a support;
   spraying dry ice pellets having a particle shape to the support, after the laminating; and
   removing the support by pulverizing at least a part of the support, after the spraying,
   wherein the support includes:
      a first region including a joint surface joined to the half-finished product; and
      a second region other than the first region;
   wherein the laminating includes forming the first region as a porous body having a plurality of holes into which each of the dry ice pellets is capable of entering at least partially, and
   wherein the removing includes:
      pulverizing the first region by spraying the dry ice pellets to the first region; and
      removing a remainder which remains unpulverized after the pulverizing.

2. The additive manufacturing method according to claim 1,
   wherein the half-finished product includes at least one overhang portion having a surface facing downward in a laminating direction of the metal, and the support supports the at least one overhang portion.

3. The additive manufacturing method according to claim 1, further comprising performing etching processing on the support before the removing.

4. The additive manufacturing method according to claim 1, wherein the second region includes a solid body.

5. The additive manufacturing method according to claim 1,
wherein the first region has a grid structure.

6. The additive manufacturing method according to claim 1,
wherein the product is a turbocharger housing, a compressor impeller, a gas turbine blade, or a combustor component.

7. An additive manufacturing method of manufacturing a product by laminating metal, the additive manufacturing method comprising:
laminating the metal so as to form a half-finished product of the product and a support;
spraying dry ice pellets having a particle shape to the support, after the laminating; and
removing the support by pulverizing the support entirely, after the spraying,
wherein the laminating includes forming the support entirely as a porous body having a plurality of holes into which each of the dry ice pellets is capable of entering at least partially.

8. The additive manufacturing method according to claim 7,
wherein the half-finished product includes at least one overhang portion having a surface facing downward in a laminating direction of the metal, and the support supports the at least one overhang portion.

9. The additive manufacturing method according to claim 7, further comprising performing etching processing on the support before the removing.

10. The additive manufacturing method according to claim 7,
wherein the support has a grid structure.

11. The additive manufacturing method according to claim 7,
wherein the product is a turbocharger housing, a compressor impeller, a gas turbine blade, or a combustor component.

* * * * *